United States Patent

Schmidt et al.

Patent Number: 6,160,585
Date of Patent: Dec. 12, 2000

[54] SYSTEM FOR SELECTIVE MULTICASTING IN A COMMUNICATIONS SYSTEM

[75] Inventors: William George Schmidt, Sun Lakes; Om Prakash Gupta, Phoenix, both of Ariz.

[73] Assignee: Motorola, Inc., Schaumburg, Ill.

[21] Appl. No.: 08/990,394

[22] Filed: Dec. 15, 1997

[51] Int. Cl.[7] .................................................. H04N 7/18
[52] U.S. Cl. .................................... 348/423; 348/429
[58] Field of Search ............................... 348/423, 429, 348/434, 435

[56] References Cited

U.S. PATENT DOCUMENTS 6,040,867  3/2000  Bando et al. ........................... 348/423

*Primary Examiner*—Melvin Marcelo
*Attorney, Agent, or Firm*—Harold C. McGurk; James E. Klekotka

[57] ABSTRACT

A transmitting unit (10) transmits a video digital signal. The transmitting unit (10) is the delivery system associated with a source that can provide digital video signals, including but not necessarily limited to a satellite television system, a local television station or a cable television provider. A receiving unit (100) receives the broadcasted signal and demultiplexes the signal into a multicasting segment (52) and a baseline video bitstream (54). A portion of the multicasting segment (52) is stored in memory until such time that it is displayed on a television monitor (110). The baseline video bitstream (54) usually comprises a television show which is displayed on the television monitor (110) unless the multicasting segment (52) (e.g., commercial) is being displayed.

12 Claims, 2 Drawing Sheets

SYSTEM FOR SELECTIVE MULTICASTING IN A COMMUNICATIONS SYSTEM

FIELD OF THE INVENTION

The present invention relates generally to the field of communication systems, and more specifically, to a communication system for selective transmission and reception of specific data.

BACKGROUND OF THE INVENTION

When conventional television stations, cable television or satellite systems broadcast or transmit television signals, all receiving units that are able to receive the transmission receive the same signal. The signal consists of television video (e.g., television shows, movies, game shows, cartoons, etc.) and commercials. All receivers able to receive the signal views the same television video and the same commercials. The problem with this conventional approach is that advertisements broadcast in the conventional manner cannot target specific audiences. For example, the Cadillac division of General Motors would prefer that its commercials be directed to households that have a higher-than-average per capita income. Accordingly, there exists a need for a system for transmitting specific commercials to specific receiving units.

DETAILED DESCRIPTION OF THE PREFERRED EMBODIMENT

In the present invention, a satellite, a local television station, cable system provider or any other source that can provide digital video signals transmits digital media signals, specifically commercial video signals, to various points within a select coverage region. While some data, such as a television show for example, is broadcast to all receivers most of the time, some data such as particular commercials, are distributed to only to preselected receivers. The preselected receivers are chosen based upon certain demographic or marketing information known about who is intended to receive the information. Although local television stations and cable system providers generally do not transmit digital signals at this time, it is anticipated that these service providers will be converting over to digital transmission systems in the near future.

Figure 1:
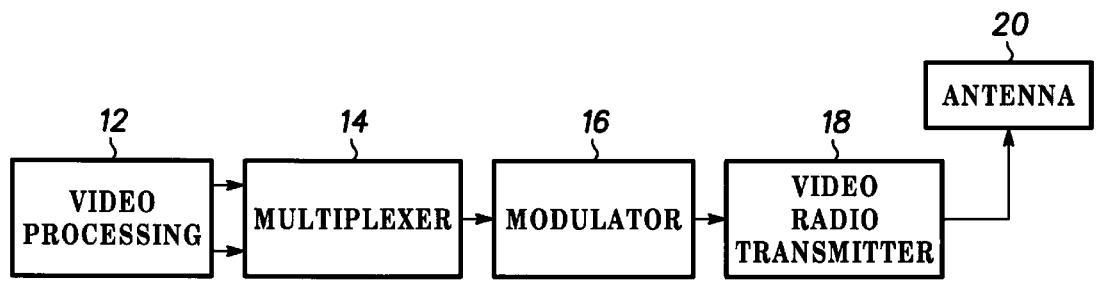
FIG. 1 shows a block diagram of a transmitting unit according to a preferred embodiment of the present invention.

FIG. 1 shows a block diagram of transmitting unit 10 according to a preferred embodiment of the present invention. As shown in FIG. 1, transmitting unit 10 comprises video processing equipment 12, multiplexer 14, modulator 16, video radio transmitter 18 and antenna 20. These parts of transmitting unit 10 are well known to those of ordinary skill in the art and are commercially available.

Video processing equipment 12 is responsible for generating two video data signals and sending them to multiplexer 14. One of the video data signals represents bitstreams of any type of video program, including but not limited to television shows, movies, game shows, cartoons, news, etc. The other video data signal is a multicasting segment, comprising bitstreams of a number of any type of advertisements or commercials.

Figure 2:
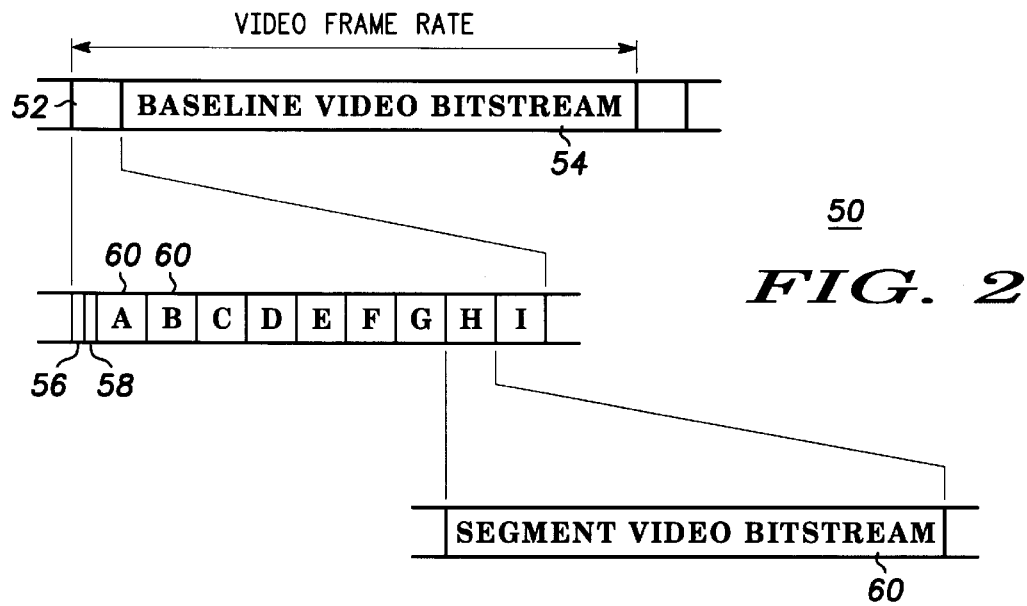
FIG. 2 shows a time-division multiplexing protocol according to a preferred embodiment of the present invention.

Once video processing equipment 12 transmits the two video data signals to multiplexer 14, multiplexer 14 combines the two video data signals into a single video data signal, the format of which is shown in FIG. 2. FIG. 2 shows a portion of a multi-destinational, time-division multiplexing, video signal 50 according to a preferred embodiment of the present invention. The portion of the signal shown in FIG. 2 is referred to as a frame. Frame 50 comprises multicasting segment 52 and baseline video bitstream 54. Although the preferred embodiment of the present invention uses a format that is similar to a time-division format, alternative embodiments can use other standard formats. By using the time-division format, the normal or baseline video is received continuously by all receivers, while only select data or information is decoded and stored by specific receivers.

Video processing equipment 12 provides multicasting segment 52 which is a composition of different data bitstreams. Multicasting segment 52 comprises frame synchronization bits 56, control bits 58 and addressable video segments 60. Video processing equipment 12 is responsible for generating frame synchronization bits 56, control bits 58 and each addressable video segment 60. Frame synchronization bits 56 are for determining where data begins and synchronizing the receiver equipment. Frame synchronization bits 56 are well known to those of ordinary skill in the art.

Control bits 58 have a variety of functions. In the preferred embodiment, at least one bit represents whether the receiver equipment should start displaying the video segments stored in the receiving unit's memory. Control bits can be used to designate whether to display the television program or the stored commercials. In alternative embodiments, control bits can control whether baseline video bitstream 54 is pass through or stored in memory, what addressable video segment the receiver will download, or whether to pass through addressable video segments 60 to the monitor, especially when the receiver unit is first turned on, because no addressable video segments had been previously stored in memory. Control bits 58 can also be used for indicating how many addressable video segments 60 there are in multicasting segment 52.

Addressable video segments 60 comprise a number of video data segments. Each segment is a bitstream of data and preferably comprises, but not necessarily limited to, a pre-determined portion any type of advertisement or commercials. In alternative embodiments, addressable video segments can be any portion of any type of video data, not limited to commercial or advertisements only. Video processing equipment 12 determines how much data to provide to multiplexer 14 so that each portion of addressable video segment 60 has the same length.

Although FIG. 2 shows nine addressable video segments 60, the number of addressable video segments 60 does not have to be fixed and can be any number. The number of addressable video segments 60 can also be dynamic, random or adjustable based on the number of different audiences trying to be reached.

Multicasting segment 52 utilizes a "blanking" period of the TV scan to transmit, on a per frame basis, a segment of data, including for example, segments of a commercial. Each receiver equipment recognizes multicasting segment 52 and then scans the subsequent data fields from the addressable video segments 60 to find a preselected video. A fixed number of bits subsequent to frame synchronization bits 56 represent the addressable video segment 60 and are extracted from the main bitstream and sent to a memory or storage units in the receiving unit. The bits in multicasting segment 52 of the main video TDM transmission are not passed to the video processing equipment.

Baseline video bitstream 54 comprises video data. Baseline video bitstream 54 is transmitted directly to the video processing equipment and then to the video monitor where the video is displayed. The main video transmission bitstream is preferably a 1/30 second frame. The frame rate is 1/30 seconds according to the NTSC (National Television Standard Conference) standard format of North America. Other frames rates can be chosen to match the regional TV and the possible use of video compression standards.

Format 50 shown in FIG. 2 is one of many different possible formats. Other formats can be used for alternative embodiments of the present invention, including but not necessarily limited to having parts of multicasting segment 52 follow baseline video bitstream 54 or having control bits 58 follow addressable video segments 60, for example.

Returning to FIG. 1, once multiplexer 14 combines the two video data signals (e.g., bitstreams) into one video signal having the format shown in FIG. 2, the video signal is sent to modulator 16 where it is converted from a digital baseband signal to an analog signal. In the preferred embodiment, this radio frequency (RF) signal is transmitted by video radio transmitter 18 via antenna 20. The RF signal can be received by a satellite, which rebroadcasts the signal to a select region of the earth. Although the preferred embodiment is applicable to satellite communication systems or local television station transmissions, in alternative embodiments, video radio transmitter 18 and antenna 20 can be replaced with other conventional means of delivery of video signals, including cable transmission systems, for example. Moreover, the parts shown in FIG. 1 of transmitting unit 10 is not limited to one particular piece of physical equipment, but can be implemented in separate physical devices.

Figure 3:
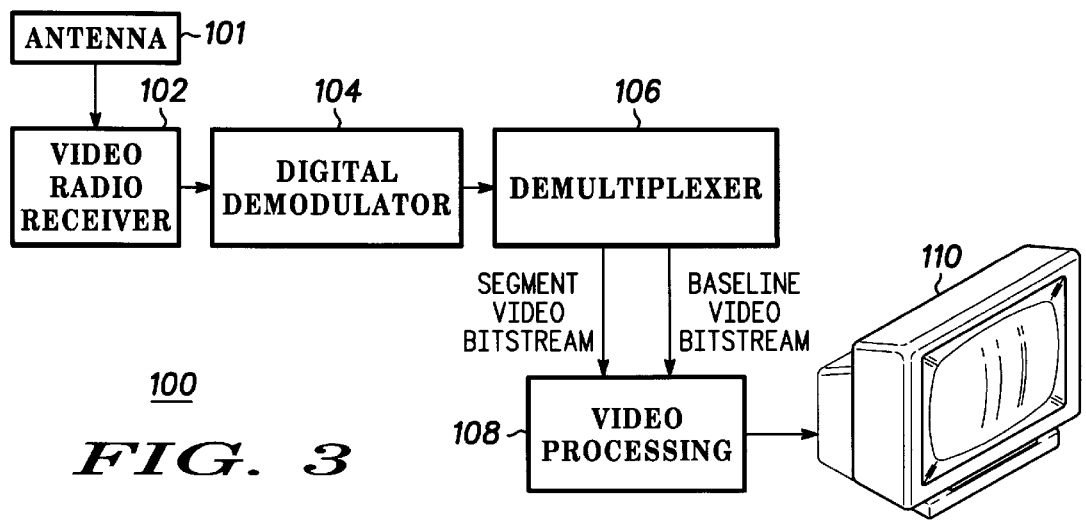
FIG. 3 shows a block diagram of a receiving unit according to a preferred embodiment of the present invention.

FIG. 3 shows a block diagram of a receiving unit according to a preferred embodiment of the present invention. Receiver equipment 100 comprises antenna 101, video radio receiver 102, demodulator 104, demultiplexer 106, video processing equipment 108 and monitor 110. Antenna 101, video radio receiver 102, digital demodulator 104 and demultiplexer 106 and monitor 110 are well known to those of ordinary skill in the art and are commercially available. Video processing equipment 108 may be commercially available, or it can be built from commercially available parts.

Antenna 101 receives a radio frequency (RF) signal from a satellite or a local television station where it is sent to video radio receiver 102. Video radio receiver 102 preferably comprises a conventional RF (radio frequency) receiver with a low-noise amplifier, a converter to an intermediate frequency (IF) band and some channel filtering. For cable television, video radio receiver 102 is adapted to receive the video signal from cable. In alternative embodiments, antenna 101 and video radio receiver 102 can be replaced with other conventional means of delivery of video signals, including cable transmission systems, for example.

Once the video signal is received and converted by video radio receiver 102, the IF signal then is passed to digital demodulator 104 where the received signal is converted to a digital baseband signal. It is the digital baseband signal which is transmitted to demultiplexer 106, where the frame synchronization bits are detected and tracked. The two video bitstreams, multicasting segment 52 (FIG. 2) and baseline video bitstream 54 (FIG. 2) are demultiplexed and separately provided to video processing equipment 108.

Video processing equipment (VPE) 108 comprises memory (or a buffer) and a processor. The memory stores one of the addressable video segments 60 (FIG. 2). The processor of VPE 108 decodes from the control bits (58, FIG. 2) of multicasting segment 52 (FIG. 2) whether to display or store the video data stored in VPE 108. VPE 108 also has the decompression capability that is typically required to operate on the video bitstreams. VPE 108 also has a timing controller so that the segment video is injected at the appropriate moment into the main signal entering video monitor 110.

VPE 108 selects one of the addressable video segments 60. Which addressable video segment VPE 108 selects can be programmed into receiving unit 100. The programming can be either static or dynamically changed based on the same or a different signal. Which receiving unit 100 is selected to receive what commercial can be based upon certain demographic or marketing information. For example, the receivers can be programmed based on income levels.

Video monitor 110 is a commercially available, color (or black and white) monitor for displaying the baseline video bitstream as well as the stored addressable video segments.

When transmitting unit 10 (FIG. 1) and receiving unit 100 (FIG. 3) are combined, a system is created that broadcasts and receives a video signal. The system can deliver specific advertisements to specific audiences. This system can charge premium advertising rates because specific advertisements can reach specific audiences. Demographically targeted advertising is now made possible.

Figure 4:
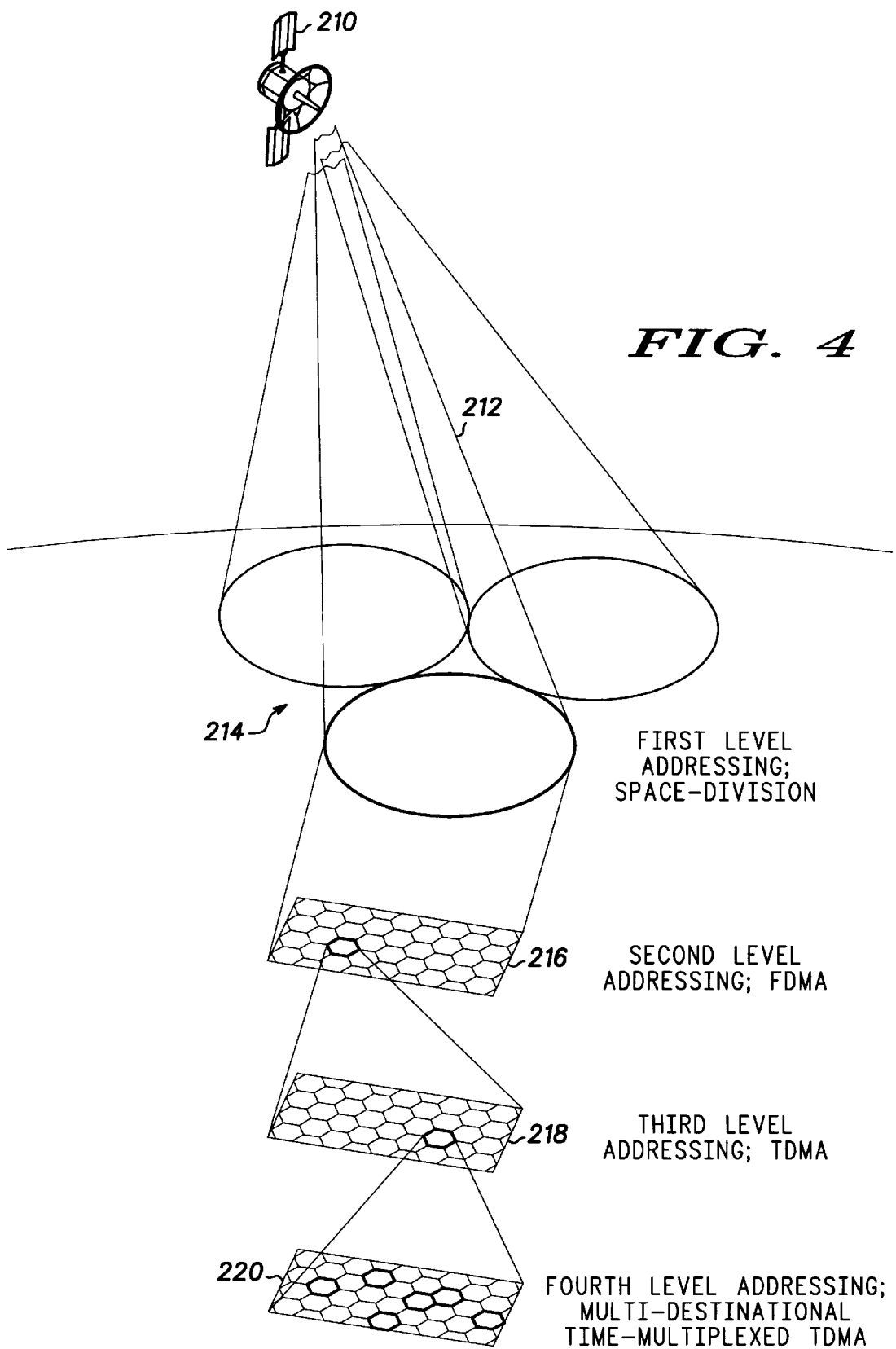
FIG. 4 shows an example of a satellite broadcasting a multicast signal according to a preferred embodiment of the present invention.

FIG. 4 shows an example of satellite 210 broadcasting a multicast signal according to a preferred embodiment of the present invention. Basic to the downlink distribution of any signals via communications satellite 210 is footprint 214 of downlink antenna beam 212. Beam footprint 214 represents a space-division (e.g., geographical delineation) with respect to the footprints of other beams. Beam footprint 214 represents a first level of a multicasting hierarchy. The first level of the hierarchy is based upon the determination as to whether the desired receiving community is or is not within the geographical bounds of the beam footprint.

The region from which a local television station or a cable system transmits their signals similarly represents the first level of multicasting. Since it is this region which determines who will receive the transmission, this region is also a geographical delineation.

The next level of address discrimination can be based upon the geographical location within the footprint, or some discrimination as to the function, content and/or distribution properties of the signal. For example, a number of sets of video channels (e.g., Prime, Intermediate, Standard) could be a functional discriminator. The implementation of this further level of discrimination could be based upon any of the conventional and standard multiple-access schemes: frequency-division multiple access, time-division multiple access, code-division multiple access or variants or combinations of these techniques. As shown in FIG. 1, frequency-division multiple access 216 and time-division multiple access 218 are second and third levels of addressing for the preferred embodiment. In alternative embodiments, the number of addressing levels can be more or less than the two intermediate addressing levels shown in FIG. 1.

The final level of addressing, referred to as multi-destinational time-division 220 is one of the keys of the preferred embodiment of the present invention. The object is to obtain the capability of providing a further level of multicasting without substantially requiring more bandwidth, power or complexity of the receiver. Unique market-targeted advertisements (e.g., commercials) are transmits and received by preselected receivers. The preselected receivers can be chosen based on various marketing information, including but not limited to surveys, interviews and studies. The addressing format can match advertisements with those who would most likely be interesting in purchasing the desired product or service. Advertisers thus are able to more effectively target their desired audience by knowing their commercials were being viewed by those people most interested in purchasing the product or service.

One of the many advantages of the invention is its unique multicasting addressable capability that is particularly useful in selective addressing of media material, especially in the video distribution arena. Another advantage of the invention is the ability to provide demographically addressable material which can be extended to selectively distribute selected segments to select receiver equipment. A further advantage of the invention is the reduction in bandwidth requirements when using the time-division multiplex structure and distributed fashion of the segment signal.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A transmitting unit for transmitting a video data signal, comprising:
   video processing equipment for providing a multicasting segment and a baseline video bitstream, wherein the multicasting segment comprises frame synchronization bits, control bits, and addressable video segments,each of the addressable video segments comprising a portion of one of a plurality of commercials, wherein the control bits are used by a preselected receiving unit to determine when to receive, when to store, and when to display the addresssable video segments;
   a multiplexer coupled to the video processing equipment for combining the multicasting segment and the baseline video bitstream into a signal;
   a modulator coupled to the multiplexer;
   a video radio transmitter coupled to the modulator; and
   an antenna coupled to the video radio transmitter, wherein the antenna transmits the signal to a satellite which broadcasts the signal over one of a plurality of antennas on the satellite.

2. The transmitting unit as recited in claim 1, the addressable video segments further comprising a portion of one of a plurality of advertisements.

3. The transmitting unit as recited in claim 1, wherein the preselected receiving unit is established based upon an income level.

4. The transmitting unit as recited in claim 1, wherein the baseline video bitstream comprises frames of a movie.

5. The transmitting unit as recited in claim 1, wherein each of the plurality of commercials is distributed based upon marketing information know about the intended receiver.

6. The transmitting unit as recited in claim 1, wherein the baseline video bitstream comprises frames of a television program.

7. The transmitting unit as recited in claim 1, wherein the modulator modulates the signal from a digital baseband signal to an analog signal.

8. A receiving unit for receiving a video data signal, comprising:
   a demodulator;
   a demultiplexer coupled to the demodulator for receiving a signal from the demodulator and separating the signal into a multicasting segment and a baseline video bitstream, wherein the multicasting segment comprises frame synchronization bits, control bits, and addressable video segments,each of the addressable video segments comprising a portion of one of a plurality of commercials, wherein the control bits are used by the receiving unit to determine when to receive, when to store, and when to display the one of the commercials;
   video processing equipment coupled to the demultiplexer, wherein the video processing includes a memory for storing and aggregating portions of one of the commercials;
   a monitor coupled to the video processing equipment for displaying the baseline video bitstream and the portions of the addressable video segments, the video processing equipment transmitting portions of the one of the commercials to the monitor when the control bits indicate that the one of the commercials is to be displayed;
   a video radio receiver coupled to the demodulator; and
   an antenna coupled to the video radio receiver, wherein the antenna receives the signal from a satellite.

9. The receiving unit as recited in claim 8, the addressable video segments further comprising a portion of one of a plurality of advertisements.

10. The receiving unit as recited in claim 8, wherein the baseline video bitstream comprises frames of a movie.

11. The receiving unit as recited in claim 8, wherein the baseline video bitstream comprises frames of a television program.

12. The receiving unit as recited in claim 8, wherein the demodulator demodulates the signal from an analog signal to a digital baseband signal.

* * * * *

UNITED STATES PATENT AND TRADEMARK OFFICE
CERTIFICATE OF CORRECTION

PATENT NO.    : 6,160,585
DATED         : December 12, 2000
INVENTOR(S)   : William George Schmidt et al.

It is certified that error appears in the above-identified patent and that said Letters Patent is hereby corrected as shown below:

Column 6, claim 5,
Line 11, delete "know" and replace with -- known --.

Signed and Sealed this

Nineteenth Day of March, 2002

Attest:

JAMES E. ROGAN
Director of the United States Patent and Trademark Office

Attesting Officer